(12) United States Patent
Ettlinger

(10) Patent No.: US 9,815,006 B2
(45) Date of Patent: Nov. 14, 2017

(54) DEVICE FOR CONTINUOUSLY FILTERING MATERIAL MIXTURES

(75) Inventor: Roderich Ettlinger, Augsburg (DE)

(73) Assignee: ETTLINGER KUNSTSTOFFMASCHINEN GMBH, Königsbrunn (DE)

( * ) Notice: Subject to any disclaimer, the term of this patent is extended or adjusted under 35 U.S.C. 154(b) by 868 days.

(21) Appl. No.: 13/995,243

(22) PCT Filed: Dec. 1, 2011

(86) PCT No.: PCT/EP2011/071464
§ 371 (c)(1),
(2), (4) Date: Jun. 18, 2013

(87) PCT Pub. No.: WO2012/079993
PCT Pub. Date: Jun. 21, 2012

(65) Prior Publication Data
US 2013/0277289 A1 Oct. 24, 2013

(30) Foreign Application Priority Data
Dec. 18, 2010 (DE) .................. 10 2010 055 167

(51) Int. Cl.
*B01D 33/06* (2006.01)
*B29C 47/08* (2006.01)
(Continued)

(52) U.S. Cl.
CPC .......... *B01D 33/06* (2013.01); *B29C 47/0888* (2013.01); *B29C 47/687* (2013.01);
(Continued)

(58) Field of Classification Search
CPC .................................................. B01D 29/665
See application file for complete search history.

(56) References Cited

U.S. PATENT DOCUMENTS 2,142,737 A * 1/1939 Schaff .................... B01D 37/02
210/193
2,455,297 A * 11/1948 Curtis .................... F04C 29/02
184/6.16
(Continued)

FOREIGN PATENT DOCUMENTS

| CH | 504 945 A | 3/1971 |
|---|---|---|
| CN | 1898002 A | 1/2007 |

(Continued)

OTHER PUBLICATIONS

Hans-Georg Rielmann, Machine Translation of DE 102007006072 A1, Aug. 2008.*

*Primary Examiner* — Bobby Ramdhanie
*Assistant Examiner* — Michael An
(74) *Attorney, Agent, or Firm* — McGlew and Tuttle, P.C.

(57) ABSTRACT

A device for continuously filtering material mixtures, particularly for separating contaminants out of plastic melts, includes a filter (3), which is rotatably arranged in a filter chamber (2) of a housing (1), at least one wiper (17) for lifting off contaminants retained by the filter (3), and a discharge device (18) for removing the contaminants lifted off the filter (2) by the wiper (17) from the housing (1). The discharge device (18) includes a discharge shaft (19), which is rotatably arranged at the housing (1) and which has at least one continuous opening (20) having at least one piston (22) which is movably guided therein.

21 Claims, 4 Drawing Sheets

(51) Int. Cl.
    *B29C 47/68*    (2006.01)
    *B29C 47/00*    (2006.01)
(52) U.S. Cl.
    CPC .......... *B29C 47/0009* (2013.01); *B29C 47/68* (2013.01); *B29C 2947/9259* (2013.01); *B29C 2947/92961* (2013.01)

(56) References Cited

U.S. PATENT DOCUMENTS

| | | | | |
|---|---|---|---|---|
| 4,174,198 | A * | 11/1979 | Kinoshita | B01D 29/46 210/407 |
| 4,177,234 | A * | 12/1979 | Lowry | B29B 17/02 210/415 |
| 4,470,904 | A * | 9/1984 | Gail | B01D 29/111 210/103 |
| 5,618,423 | A | 4/1997 | Lin | |
| 6,378,705 | B1 * | 4/2002 | Bacher | B01D 29/01 210/397 |
| 7,820,039 | B2 * | 10/2010 | Schulz | B01D 33/15 210/107 |
| 7,824,544 | B2 | 11/2010 | Ettlinger | |
| 2007/0068867 | A1 | 3/2007 | Ettlinger | |
| 2007/0102342 | A1 | 5/2007 | Lin | |

FOREIGN PATENT DOCUMENTS

| | | |
|---|---|---|
| DE | 202 10 115 U1 | 11/2003 |
| DE | 203 19 752 U1 | 5/2005 |
| DE | 102007006072 A1 * | 8/2008 |
| WO | 93/15819 A1 | 8/1993 |

* cited by examiner

DEVICE FOR CONTINUOUSLY FILTERING MATERIAL MIXTURES

CROSS REFERENCE TO RELATED APPLICATIONS

This application is a United States National Phase Application of International Application PCT/EP2011/071464 filed Dec. 1, 2011 and claims the benefit of priority under 35 U.S.C. §119 of German Patent Application DE 10 2010 055 167.8 filed Dec. 18, 2010, the entire contents of which are incorporated herein by reference.

FIELD OF THE INVENTION

The present invention pertains to a device for continuously filtering mixtures of materials, especially for separating impurities from plastic melts.

BACKGROUND OF THE INVENTION

Used plastics or plastic wastes usually contain high percentages of foreign substances, e.g., metal parts, paper remnants, glass, secondary plastics and the like. These foreign substances or impurities must, as a rule, be removed before the recycling of the plastics. This is frequently performed by the used plastics being at first plasticized by heating and by the plastic melt being subsequently filtered. So-called melt filters, by which the metallic or nonmetallic foreign substances or higher-melting plastics are separated, are used for this. However, the melt filters must be constantly cleaned to make continuous and trouble-free filtration possible.

A device of this type with a filter arranged in a filter space of a housing with a stripper for lifting off impurities retained by the filter and with a discharge means for removing the impurities lifted off from the filter by the stripper from the housing is known from DE 202 10 115 U1. The discharge means comprises in this prior-art device a feed screw, which is arranged within the housing in the immediate vicinity of the stripper and extends in parallel to the axis of rotation of the tubular filter. The feed screw is arranged such that the residues or impurities lifted off by the stripper from the outside of the filter are transferred directly to the feed screw and are removed by this from the housing. One drawback of this conveying means is that the impurities must be transported over the entire length of the feed screw and hence over a relatively long conveying path. In addition, there is a direct connection from the filter space in the housing via the feed screw in such a conveying means, so that, on the one hand, overflow of the material being conveyed into the feed screw intended for removing the impurities may occur.

SUMMARY OF THE INVENTION

An object of the present invention is to provide a device of the above-mentioned type with a simple design, which makes it possible to remove the impurities or residues retained by the filter rapidly and reliably.

According to the invention, a device is provided for the continuous filtering of material mixtures, especially for separating impurities from plastic melts. The device comprises a filter arranged rotatably in a filter space of a housing. At least one stripper is provided for lifting off the impurities retained by the filter. A discharge means is provided for removing the impurities lifted off by the stripper from the filter from the housing. The discharge means comprises a discharge shaft, which is arranged rotatably relative to the housing and has at least one continuous opening with at least one piston guided displaceably in the opening.

In the device according to the present invention, the discharge means contains a discharge shaft, which is arranged rotatably at the housing and has at least one continuous opening with at least one piston guided displaceably in same. The material lifted off from the filter by the stripper can be removed to the outside relatively rapidly without long conveying paths by the piston, which is displaceable at right angles to the axis of rotation or even in the direction of the axis of rotation of the discharge shaft, and the discharge shaft with the piston arranged therein seals off the pressurized filter space to the outside. Since there is no continuously open connection between the filter space and a discharge opening for the discharge of the impurities retained by the filter, overflow of the material mixture to be filtered into the area intended for the removal of the filter residues can be avoided. The device according to the present invention has a simple and cost-effective design and is designed especially for filtering mixtures of materials with a lower degree of contamination.

The opening may be designed, e.g., as a continuous slot, in which an individual, pusher-like piston is arranged. However, a plurality of pusher-like pistons may also be arranged in the slot. Tilting about the longitudinal axis occurring because of an unfavorable width-to-length ratio can be prevented hereby in case of individual pushers. A plurality of slot-like or round openings, which are separated from each other and are located at spaced locations from one another in the axial direction of the discharge shaft, may also be arranged in the discharge shaft with a pusher-like piston or round piston each arranged therein, and the openings may have the same orientation or may be angularly offset in the circumferential direction.

The discharge shaft is advantageously arranged in a longitudinal hole of the housing, which said hole is open towards the filter space, such that a part of the discharge shaft extends through a recess of the housing that is open towards the filter space. A discharge opening is provided for the discharge of the impurities being removed by the discharge means on the side of the housing located opposite the recess.

In a preferred embodiment, the pusher-like piston has, when viewed in the direction of displacement, a smaller width than the diameter of the discharge shaft. As a result, the pusher-like piston can be displaced radially within the slot during a rotation of the discharge shaft and form receiving chambers for the impurities thereby.

The speed of the carrier shaft with the filter arranged thereon and the speed of the discharge shaft can be advantageously controlled separately, as a result of which separate regulation of the speed of cleaning and of the speed of discharge of foreign substances is made possible. A very high concentration of foreign substances and hence high yield of the primary material are achieved by such a regulation.

Further peculiarities and advantages of the present invention appear from the following description of a preferred exemplary embodiment on the basis of the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
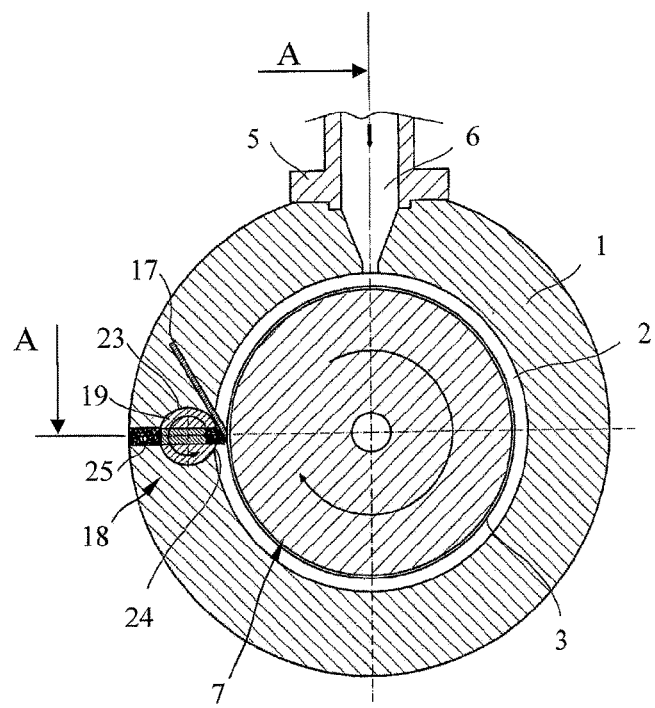
FIG. 1 is a cross-sectional view showing a filter device according to the present invention with a cleaning means.
Figure 2:
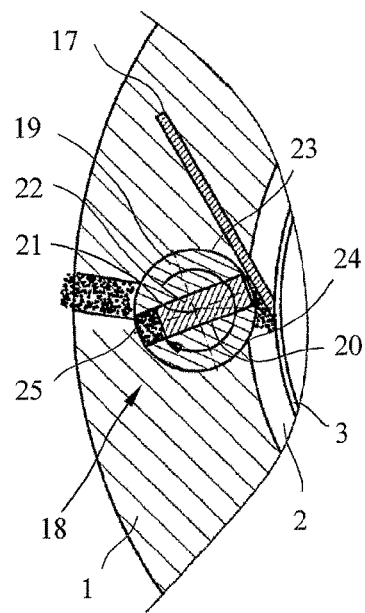
FIG. 2 is a partial enlarged view of the cleaning means from FIG. 1.
Figure 3:
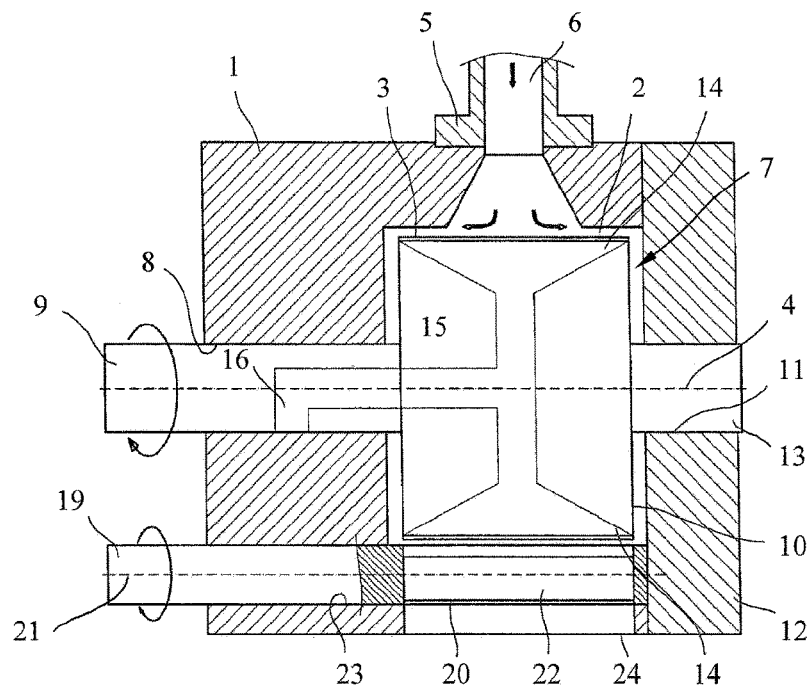
FIG. 3 is a sectional view of the filter device along line A-A in FIG. 1.

Referring to the drawings in particular, the device for filtering contaminated plastic melts shown in various views in FIGS. 1 through 3 contains a housing 1 with a filter space 2, in which a hollow cylindrical filter 3 is arranged rotatably about an axis of rotation 4. Housing 1 contains a material inlet 5 with a feed opening 6, via which the material to be filtered is introduced into the filter space 2. Filter 3, which consists, e.g., of a tube with a plurality of radial holes, is seated on a carrier shaft 7, which is rotationally driven by means of a motor and contains, according to FIG. 3, a more slender drive pin 9 mounted rotatably in a hole (bore) 8 of housing 1, a broadened mounting part 10 for filter 3, which said mounting part is arranged in filter space 2 of housing 1, and a bearing journal 13 mounted rotatably in a corresponding hole (bore) 11 of a bearing cap 12 fastened to the housing 1. The filter 3 seated on the mounting part 10 is rotatable within the filter space 2 of housing 1 by means of the drive pin 9 coupled with a rotating drive, not shown.

The tubular filter 3 may be manufactured, e.g., from a steel plate provided with passage openings, which is bent into a tube and then welded. It is advantageously manufactured from a wear-resistant and corrosion-resistant steel and hardened. The passage openings advantageously have a cross section expanding in the direction of flow and may be, e.g., conical holes prepared by laser treatment, Filter 3 may also be provided with surface coatings, by which the wear resistance and other properties are improved.

As is apparent from FIG. 3, the carrier shaft 6 contains a plurality of collection slots 14, which are arranged distributed over the circumference of the widened mounting part 10 and form an interior space for collecting the filtered material. The collection slots 14 lead to a central collection channel 15, via which the filtered material can be removed to the outside through a radial opening 16 and a ring channel, not shown, in housing 1.

A stripper extending over the entire length of the tubular filter 2 in the axial direction and being in contact with the outside thereof is arranged in the form of a blade, a scraping knife or the like, is arranged in housing 1 such that the residues or contaminants retained on filter 2 can be lifted off from filter 2 and removed by a discharge means 18 to be explained in more detail later in the radial direction. Stripper 17 is arranged obliquely to the outer surface of filter 2 and sloped towards the direction of rotation thereof. Stripper 17 may be mounted stationarily in a preset angular position in housing 1, as this is shown in FIGS. 1 and 2. The stripper 17, designed as a scraping knife or blade, may, however, also be guided displaceably in an oblique recess in housing 1 and pressed onto the outside of filter 2 by means of a spring or another pressing element.

Discharge means 18 comprises a discharge shaft 19, which is arranged rotatably at housing 1 in the area of stripper 17, is driven by a motor, extends in parallel to the carrier shaft 7 and contains in the area of filter 2 a continuous opening 20 with a piston 22 guided displaceably in same at right angles to the axis of rotation 21 of discharge shaft 19. Opening 20 is designed as a continuous slot with an individual pusher as a piston 22 in the embodiment being shown in FIGS. 1 through 3.

Figure 4:
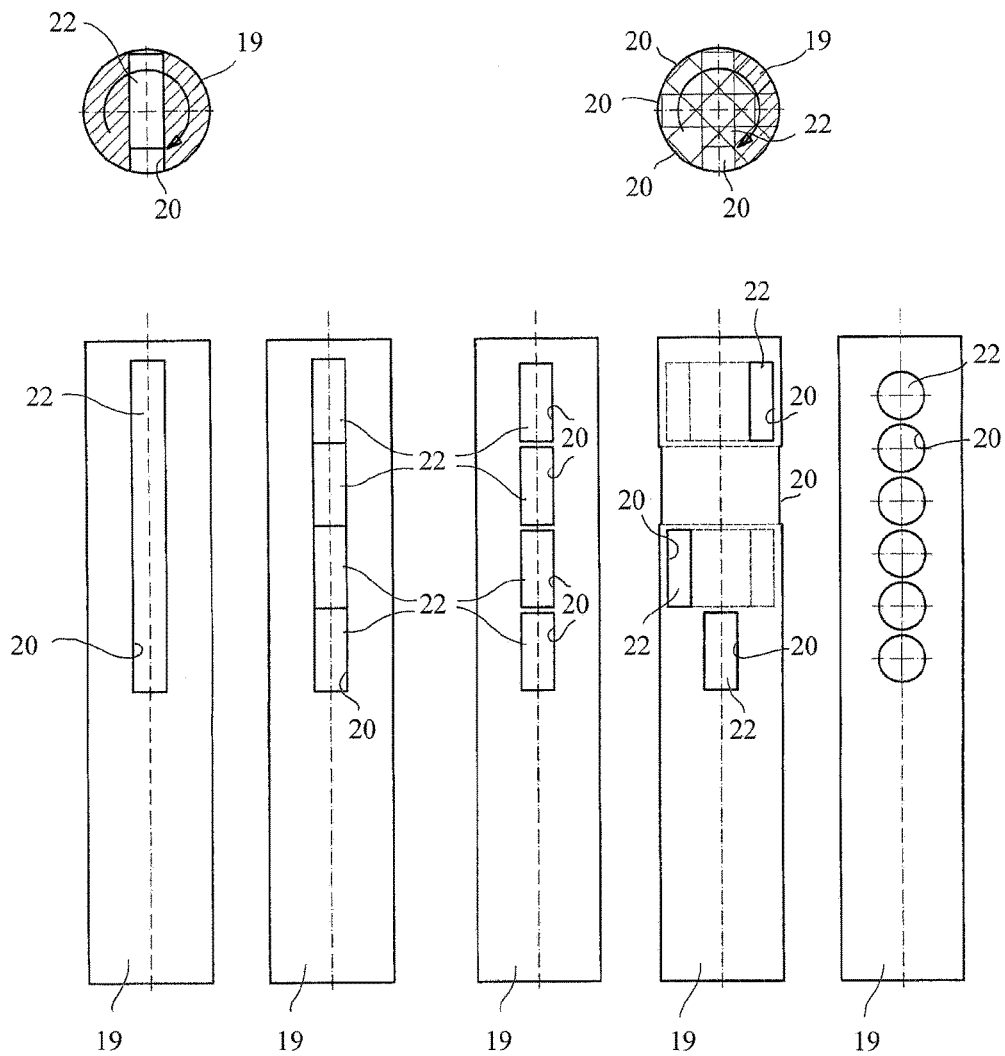
FIG. 4 is a view showing different exemplary embodiments of a discharge shaft.

FIG. 4 shows various exemplary embodiments for embodying the discharge shaft 19. In the view on the left, the discharge shaft 19 is shown with a continuous, slot-like opening 20 and with an individual pusher as a piston 22 according to FIGS. 1 through 3. A discharge shaft 19 with a continuous, slot-like opening 20 and with a plurality of separate, pusher-like pistons 22 is shown next to it. A discharge shaft 19 with a plurality of separate rectangular openings 20 and with a plurality of pusher-like pistons 22 arranged displaceably in the respective openings 20 is shown in the view in the center. Next to it is shown another exemplary embodiment of the discharge shaft 19 with a plurality of slot-like openings 20 offset angularly in the axial direction and in the circumferential direction. Four openings 20, which are offset in the axial direction and are offset by 45° each in relation to one another, are shown in the exemplary embodiment being shown. The right-hand part of FIG. 4 shows an embodiment with a plurality of round openings 20 following each other in the axial direction and corresponding round pistons 22.

Figure 5:
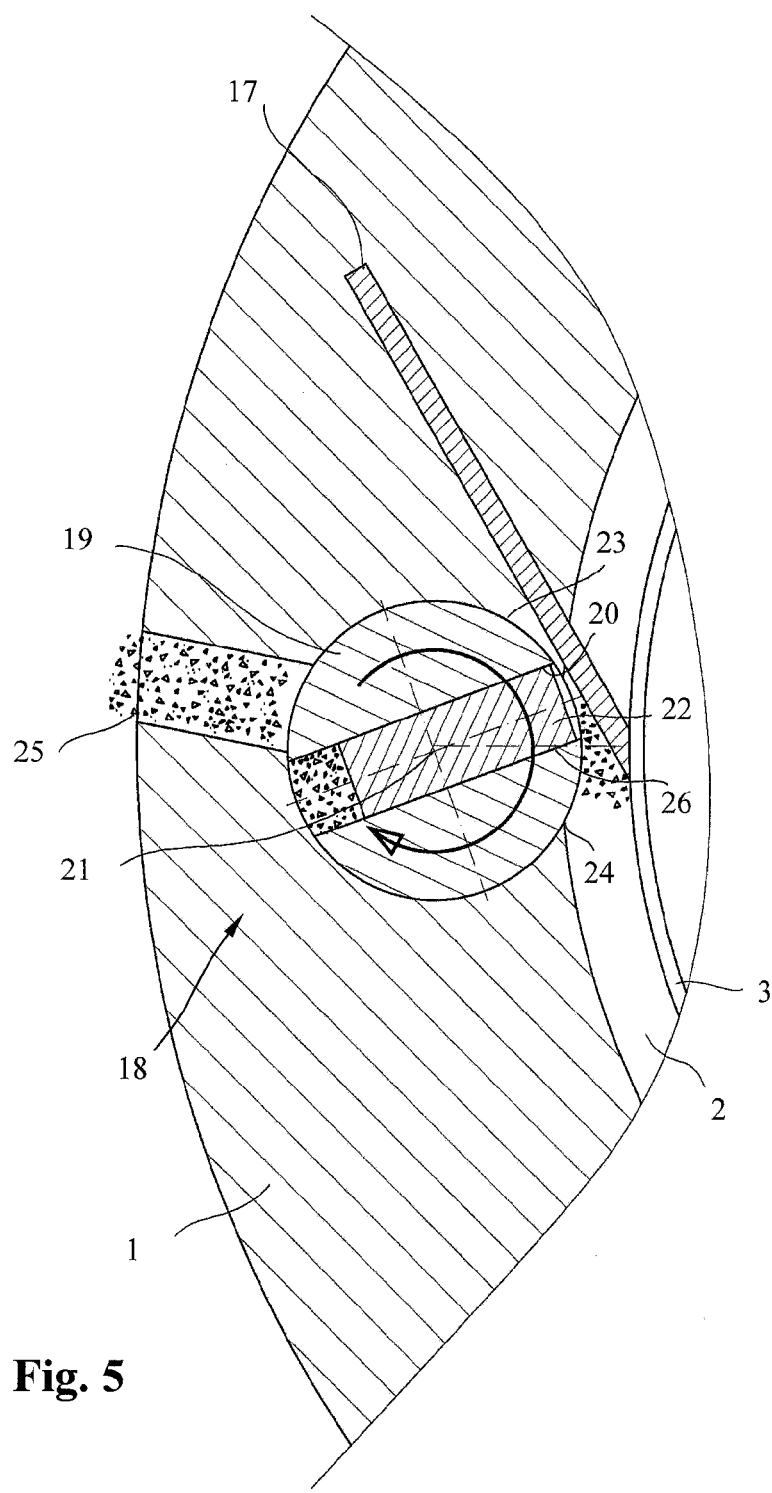
FIG. 5 is an enlarged view from FIG. 2.

According to FIG. 2, discharge shaft 19 is arranged in a longitudinal hole 23 of housing 1, which said hole is open towards the filter space 2, such that a part of the discharge shaft 19 extends through a recess 24 that is open towards the filter space 2. A slot-like discharge opening 25 for discharging the impurities retained by filter 2 and removed by and through the discharge means 18 is provided on the side of housing 1 located opposite the recess 24. As is apparent especially from FIG. 5, piston 22 has, when viewed in the direction of displacement, a smaller width than the diameter of discharge shaft 19. Piston 22 can thus be displaced radially within the continuous opening 20. The discharge opening 25 in housing 1 is arranged at an angle offset in relation to the central axis 26 of the recess 24 open towards the filter space 2 such that the continuous opening 20 opens during rotation of the discharge shaft 19 towards the discharge opening 25 only when opening 20 is already fully open at the recess 24, which is open towards the filter space 2.

Carrier shaft 7 and discharge shaft 19 can be driven such that they are regulated by different drives. For example, the speeds of the carrier shaft 7 and discharge shaft can be regulated as a function of the intended use or the prevailing pressures by a corresponding electronic unit.

In the above-described device, the contaminated material mixture (mainly plastic mass) is pressed via the feed opening 6 of housing 1 into the filter space 2 under pressure and enters the annular space formed between the outside of filter 3 and housing 1. The impurities present in the material mixture are retained by filter 3, while the filtered material reaches the collecting channel 15 through the corresponding passage openings in filter 3 via the collection slots 14 and can be removed to the outside via radial opening 16. The residues retained in filter 3 are lifted off by stripper 23 during the rotation of filter 3 and collected between stripper 17, housing 1 and discharge shaft 19. Since piston 22 has a length that is shorter than the diameter of discharge shaft 19 and is displaceable within the opening 20 of discharge shaft 19, it can form a receiving chamber for the impurities. When opening 20 reaches the recess 24 in housing 1 that is open towards the ring channel 2 during rotation of the discharge shaft 19 on one side according to FIG. 2, piston 22 is pressed radially outwardly by the internal pressure in filter space 2 and the impurities located in front of stripper 17 are pressed into the receiving chamber formed thereby. At the same time, the impurities collected on the opposite side of opening 20 are transported to the surrounding space by the motion of piston 22 via the slot-like discharge opening 25 of housing 1. Simple and nevertheless effective removal of the impurities retained by filter 2 can be guaranteed hereby.

Figure 6:
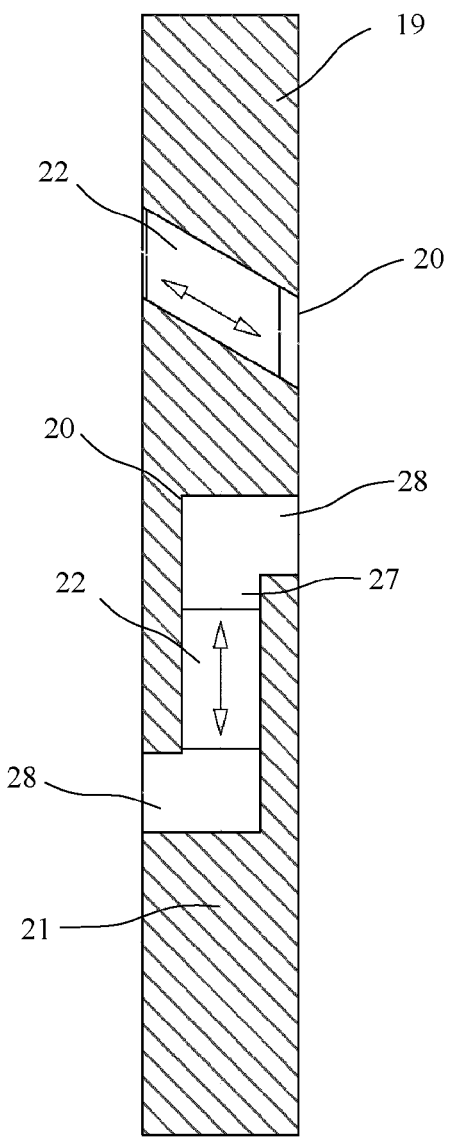
FIG. 6 is a sectional view showing a discharge shaft with further exemplary embodiments of a piston.

FIG. 6 shows further possibilities for arranging piston 22 within the discharge shaft 19 rotatable about an axis of rotation 21. In the embodiment shown in the top part of FIG. 6, opening 20, which extends at right angles through the discharge shaft 19, is arranged obliquely in relation to the axis of rotation 21 of the discharge shaft rather than at a right angle. Piston 22 is therefore also displaceable obliquely in relation to the axis of rotation 21 of discharge shaft 19 within opening 20. In the embodiment shown in the bottom part of FIG. 6, the continuous opening 20 extends at an angle with an inner area 27 extending in the longitudinal direction and two outer areas 28 extending radially outwardly at right angles to the axis of rotation 21. The two radially outwardly extending areas 28 are offset in relation to one another in the longitudinal direction of the axis of rotation and piston 22 is arranged in the inner area 27 displaceably in the longitudinal direction of discharge shaft 19.

Pressure is alternatingly admitted to piston 22, which is displaceable within the discharge shaft 19 and whose stroke is limited and said piston is connected over the entire piston area or via flow admission channels to the pressurized space of the filter and to a discharge opening via a geometrically defined control edge such that piston 22 performs a cleaning stroke by dirt located under the stripper being pressed at the same time by overpressure in the filter space into the piston space formed and by the dirt located on the discharge side being pressed into the discharge opening without a direct connection being established between the interior space of the filter and the outer space of the filter. Piston 22 can perform its emptying stroke when the pressure-side inlet opening reaches the optimal cleaning point.

The present invention is not limited to the exemplary embodiments described above. Filtering may also be carried out, e.g., with a direction of flow directed from the inside to the outside. In addition, the filter may also have a disk-shaped design or may have another, suitable shape.

While specific embodiments of the invention have been shown and described in detail to illustrate the application of the principles of the invention, it will be understood that the invention may be embodied otherwise without departing from such principles.

The invention claimed is:

1. A device for the continuous filtering of material mixtures, for separating impurities from plastic melts, the device comprising:
   a housing with a filter space and a feed opening;
   a carrier shaft in the filter space;
   a filter connected to the carrier shaft and arranged rotatably in the filter space of the housing, the carrier shaft being rotatably driven for rotating the filter in the filter space;
   a stripper supported relative to the housing in contact with the filter for lifting off the impurities retained by the filter; and
   a discharge means for removing the impurities lifted off by the stripper from the filter from the housing, wherein the discharge means comprises a piston having a piston first end and a piston second end and a discharge shaft, the discharge shaft being arranged rotatably at the housing, the discharge shaft having at least one continuous opening having an opening length with an opening length extent continuing through the discharge shaft from a shaft first outer surface portion to a shaft second outer surface portion, the piston having a length, from the piston first end to the piston second end, that is shorter than the opening length and the piston being guided displaceably in said opening between a position with the piston first end adjacent to the shaft first outer surface portion and an opposite position with the piston second end adjacent to the shaft second outer surface portion, whereby the discharge shaft is rotated such that the discharge shaft first outer surface portion faces accumulating impurities lifted off by the stripper and a first side receiving space is provided, within the opening from the piston first end to the shaft first outer surface portion, facing the accumulating impurities and upon the shaft being further rotated, the shaft second outer surface portion faces accumulating impurities lifted off by the stripper and the piston moves toward the shaft first outer surface portion to push impurities out of the first side receiving space and a second side receiving space is provided, within the opening from the second piston end to the shaft second outer surface portion, facing the accumulating impurities.

2. A device in accordance with claim 1, wherein the piston is guided displaceably in the opening at right angles to the axis of rotation of the discharge shaft.

3. A device in accordance with claim 1, wherein the piston is guided displaceably in the opening in the direction of the axis of rotation of the discharge shaft.

4. A device in accordance with claim 1, wherein:
   the piston comprises a pusher piston; and
   the opening is a continuous slot, in which the pusher piston is arranged.

5. A device in accordance with claim 1, wherein:
   the piston comprises a plurality of pusher pistons
   the opening is a continuous slot, in which the plurality of pusher pistons are arranged.

6. A device in accordance with claim 1, wherein a plurality of slot-like openings separated from one another with a pusher-like piston each arranged therein are provided in the discharge shaft.

7. A device in accordance with claim 1, wherein a plurality of round openings separated from one another with a round piston each arranged therein are provided in the discharge shaft.

8. A device in accordance with claim 6, wherein the openings are oriented in the same direction or are angularly offset in the circumferential direction.

9. A device in accordance with claim 1, wherein the discharge shaft is arranged in a longitudinal hole of the housing, which said hole is open towards the filter space, such that a part of the discharge shaft extends through a recess of the housing, which said recess is open towards the filter space.

10. A device in accordance with claim 9, wherein the housing has a discharge opening provided for the discharge of the impurities removed by the discharge means on the side of the housing located opposite the recess.

11. A device in accordance with claim 10, wherein:
the discharge opening is arranged at an angle offset in relation to a central axis of the recess, which is open towards the filter space; and
the continuous opening opens during the rotation of the discharge shaft towards the discharge opening only when the opening is already fully open at the recess, which is open towards the filter space.

12. A device in accordance with claim 1, wherein the piston has a smaller width when viewed in the direction of displacement than the diameter of the discharge shaft.

13. A device in accordance with claim 1, wherein the carrier shaft contains a drive pin mounted rotatably in a bore of the housing and the device further comprises:
a mounting part arranged in the filter space for mounting the filter;
a bearing cap; and
a bearing journal mounted in a bore of the bearing cap.

14. A device in accordance with claim 13, wherein the carrier shaft contains a plurality of collection slots for receiving filtered material.

15. A device in accordance with claim 14, wherein the collection slots lead to a collection channel, via which the filtered material is removed through a radial opening.

16. A device in accordance with claim 1, wherein the filter is designed in the form of a tube attached to the carrier shaft.

17. A device in accordance with claim 1, wherein the speed of the carrier shaft with the filter arranged thereon and the speed of the discharge shaft can be controlled separately.

18. A plastic melts continuous filtering device comprising:
a housing with a filter space and feed opening;
a carrier shaft in the filter space, the carrier shaft having a drive pin;
a filter arranged rotatably on the carrier shaft in the filter space of the housing;
a stripper supported relative to the housing in contact with the filter for lifting off impurities retained by the filter; and
a discharge arrangement for removing impurities lifted off by the stripper from the filter from the housing, the discharge arrangement comprising a piston having a piston first end and a piston second end and a discharge shaft, the discharge shaft being arranged rotatably relative to the housing and being driven in rotation, and the discharge shaft having an opening continuing through the discharge shaft from a shaft first outer surface portion to a shaft second outer surface portion, the opening having an opening extent from the shaft first outer surface portion to the shaft second outer surface portion, the piston having a length that is shorter than the opening extent and the piston being guided displaceably within the opening, along at least a portion of the opening extent, toward the shaft first outer surface portion to a position with the piston first end adjacent to the shaft first outer surface portion and away from the shaft first outer surface portion and being guided displaceably within the opening, along at least a portion of the opening extent, toward the shaft second outer surface portion to a position with the piston second end adjacent to the shaft second outer surface portion and away from the shaft second outer surface portion, whereby the shaft is rotated such that the shaft first outer surface portion faces accumulating impurities lifted off by the stripper and a first side receiving space is provided within the opening from a piston first end to the shaft first outer surface portion facing the accumulating impurities and upon the shaft being further rotated, the shaft second outer surface portion faces accumulating impurities lifted off by the stripper and the piston moves toward the shaft first outer surface portion to push impurities out of the first side receiving space and a second side receiving space is provided within the opening from a second piston end to the shaft second outer surface portion facing the accumulating impurities.

19. A device in accordance with claim 18, further comprising:
a bearing cap; and
a bearing journal connected to the carrier shaft and mounted in a bore of the bearing cap, wherein:
the drive pin is mounted rotatably in a bore of the housing and the bearing journal is mounted in a bore of the bearing cap;
the carrier shaft comprises a plurality of collection slots for receiving filtered material; and
the collection slots lead to a collection channel, via which the filtered material is removed through a radial opening, wherein:
the piston comprises a pusher piston; and
the opening comprises a continuous slot, in which the pusher piston is arranged.

20. A device in accordance with claim 1, wherein the discharge shaft arranged rotatably at the housing is driven in rotation by a drive and the carrier shaft is driven in rotation by a different drive whereby the rotation of the discharge shaft and the rotation of the carrier shaft are driven and regulated by different drives.

21. A device in accordance with claim 1, wherein a material mixture is pressed via the feed opening of the housing into the filter space under pressure and is pressed radially outwardly by the internal pressure in the filter space and impurities located in an area of the stripper are pressed into the first side receiving space or the second side receiving space, which first side receiving space or the second side receiving space is adjacent to the stripper.

* * * * *